United States Patent
Fich et al.

(10) Patent No.: US 11,833,446 B2
(45) Date of Patent: Dec. 5, 2023

(54) SYSTEM AND METHOD FOR REMOVAL OF WATER FROM OIL

(71) Applicant: C.C. Jensen A/S, Svendborg (DK)

(72) Inventors: Jens Christian Fich, Odense NV (DK); Svend Erik Kristiansen Lem, Svendborg (DK)

(73) Assignee: C.C. Jens A/S, Svendborg (DK)

( * ) Notice: Subject to any disclaimer, the term of this patent is extended or adjusted under 35 U.S.C. 154(b) by 13 days.

(21) Appl. No.: 17/413,029

(22) PCT Filed: Dec. 11, 2019

(86) PCT No.: PCT/DK2019/050384
§ 371 (c)(1),
(2) Date: Jun. 11, 2021

(87) PCT Pub. No.: WO2020/119872
PCT Pub. Date: Jun. 18, 2020

(65) Prior Publication Data
US 2022/0032205 A1    Feb. 3, 2022

(30) Foreign Application Priority Data
Dec. 12, 2018 (DK) .............................. PA201870812

(51) Int. Cl.
*B01D 1/00*    (2006.01)
*B01D 1/14*    (2006.01)
(Continued)

(52) U.S. Cl.
CPC ............... *B01D 1/14* (2013.01); *B01D 3/346* (2013.01); *C10G 33/00* (2013.01)

(58) Field of Classification Search
CPC ...................................................... B01D 1/14
(Continued)

(56) References Cited

U.S. PATENT DOCUMENTS

| 654,258 A | * | 7/1900 | Ihart | C10G 33/06 |
| | | | | 208/187 |
| 1,716,433 A | * | 6/1929 | Ellis | B01D 1/14 |
| | | | | 196/127 |

(Continued)

FOREIGN PATENT DOCUMENTS

| EP | 2801397 A1 | 11/2014 |
| WO | 9417165 A1 | 8/1994 |

OTHER PUBLICATIONS

"Fluid dynamics and Bernoulli's equation", Nov. 10, 1999, Boston Univeristy, http://physics.bu.edu/~duffy/py105/Bernoulli.html#:~:text=Making%20fluids%20flow,pressure%20at%20the%20other%20end. *

(Continued)

*Primary Examiner* — Jonathan Luke Pilcher
(74) *Attorney, Agent, or Firm* — Barclay Damon LLP

(57) ABSTRACT

A system and method for removing water from oil comprises: a housing, an oil inlet tube fluidly connecting the oil supply and an oil inlet of the housing, an inlet pump configured to pump a flow of oil from the oil supply to the oil inlet at a first pumping flow rate, an oil outlet tube fluidly connecting an oil outlet of the housing and the oil supply, an outlet pump adapted to pump a flow of oil from the oil outlet to the oil supply at a second pumping flow rate, an air inlet tube providing a gas connection between a air supply unit and an air inlet of the housing, and an air outlet tube providing a gas connection between an air outlet of the housing and the air supply unit, wherein the second pumping flow rate is greater than the first pumping flow rate

16 Claims, 2 Drawing Sheets

Figure 1:
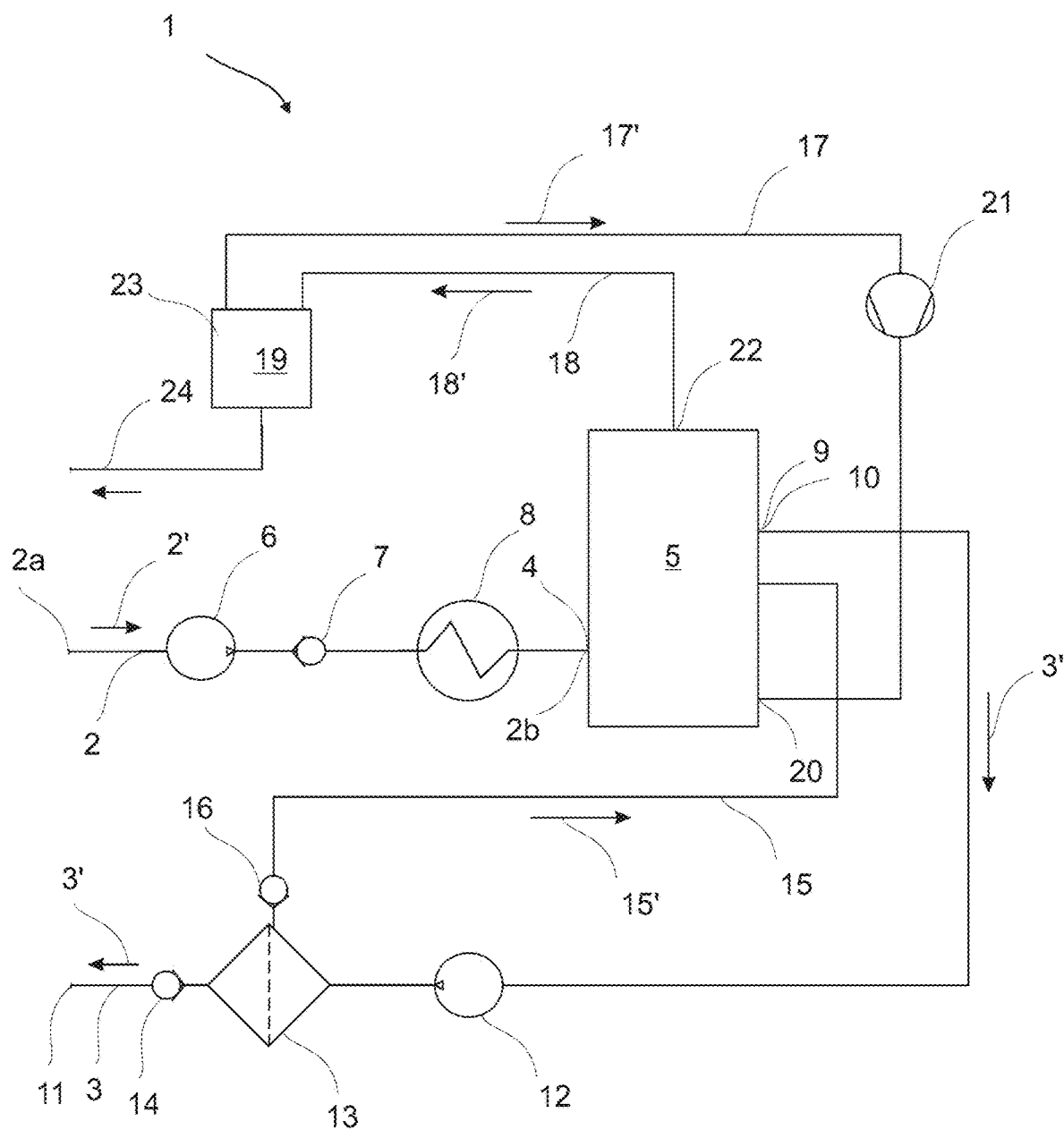

(51) Int. Cl.
*C10G 33/00* (2006.01)
*B01D 3/34* (2006.01)

(58) Field of Classification Search
USPC .............................................. 159/16.1, 16.2
See application file for complete search history.

(56) References Cited

U.S. PATENT DOCUMENTS

| | | | | |
|---|---|---|---|---|
| 2,245,551 | A * | 6/1941 | Shapiro | C10G 33/06 210/221.1 |
| 2,766,203 | A * | 10/1956 | Brown | B01D 17/0205 210/194 |
| 2,903,421 | A * | 9/1959 | Thomas | C10G 33/06 208/188 |
| 3,448,038 | A * | 6/1969 | Pall | C10G 33/06 261/96 |
| 3,891,496 | A * | 6/1975 | Erwin | B01D 3/143 159/DIG. 13 |
| 3,925,148 | A * | 12/1975 | Erwin | B01D 1/065 159/17.3 |
| 3,939,036 | A * | 2/1976 | Erwin | F28F 19/00 159/901 |
| 4,800,025 | A * | 1/1989 | Bibaeff | B03D 1/1431 210/776 |
| 5,211,856 | A * | 5/1993 | Shen | C10G 7/04 210/776 |
| 5,456,837 | A | 10/1995 | Peachey | |
| 5,656,173 | A * | 8/1997 | Jordan | C02F 1/24 210/708 |
| 8,343,316 | B2 * | 1/2013 | Williams | B01D 3/10 159/901 |
| 8,491,785 | B2 * | 7/2013 | Evanovich | C10M 175/0058 210/207 |
| 9,522,345 | B2 * | 12/2016 | Grøtheim | B01D 19/0047 |
| 9,782,693 | B2 * | 10/2017 | Evanovich | C10M 175/0058 |
| 2011/0108408 | A1 * | 5/2011 | Williams | B01D 3/10 202/234 |
| 2012/0080363 | A1 * | 4/2012 | Evanovich | C10M 175/0058 210/207 |
| 2013/0270723 | A1 * | 10/2013 | Grotheim | B01D 19/001 261/112.1 |
| 2014/0158643 | A1 * | 6/2014 | Evanovich | C10G 33/06 210/804 |
| 2016/0008740 | A1 | 1/2016 | Jensen et al. | |

OTHER PUBLICATIONS

C.C. Jensen A/S. CJC™ Desorber Clean Oil—Bright Ideas Sep. 6, 2008 (6 pages).
PCT/DK2019/050384, filed Dec. 11, 2019, International Search Report and Written Opinion, dated Feb. 18, 2020 (12 pages).
PCT/DK2019/050384, filed Dec. 11, 2019. Written Opinion of the International Preliminary Examing Authority, dated Sep. 30, 2020 (7 pages).

* cited by examiner

SYSTEM AND METHOD FOR REMOVAL OF WATER FROM OIL

CROSS-REFERENCE TO RELATED APPLICATIONS

This application is a national stage application pursuant to 35 U.S.C. § 371 of International Application No. PCT/DK2019/050384 filed on Dec. 11, 2019, which claims priority to, and the benefit of, Denmark Patent Application No. PA201870812 filed on. Dec. 12, 2018. The entire contents of such applications are hereby incorporated by reference.

The present invention relates to a system for removing water from oil from an oil supply, where the system comprises a housing comprising an inner opening, an oil inlet tube connecting the oil supply and an oil inlet of the housing, where the oil inlet tube comprises an inlet pump adapted to provide a flow of oil in a direction from said oil supply to said oil inlet, an oil outlet tube connecting an oil outlet of the housing and the oil supply, where the oil outlet tube comprises an outlet pump adapted to provide a flow of oil in a direction from said oil outlet to said oil supply, an air inlet tube providing a gas connection between an air supply unit and an air inlet of the housing, and an air outlet tube providing a gas connection between an air outlet of the housing and the air supply unit, where said outlet pump is adapted to provide a flow at a higher pumping flow rate than the pumping flow rate provided by said inlet pump.

The present invention further relates to a method of removing water from oil from an oil supply.

Oil is used as a lubricant and cooling agent in a vast number of different types of machinery and engines. During operation of the machinery or engine, the oil is slowly contaminated inter alia with solid particles arising from wear of the machinery and with water which may have been introduced into the oil through leaks in the joints of the tubing and machinery.

It is important to keep the oil as clean as possible not only from particles, but also from water. Water will not only change the viscosity of the oil thereby leading to a change of the ability of the oil to be used as a lubrication, but may also facilitate the existence of microorganisms which will degrade the oil, complicate filtering the oil and lead to formation of rust. All of these factors will lead to an increased degradation of the oil and therefore to a reduced lifetime of both the oil and of the elements of the machinery or engine. Therefore, it is important to remove water from the oil.

It is known to remove water from the oil by one of a number of different techniques, such as by:
heating the oil,
centrifuging the oil,
exposing the oil to a water-absorbing material,
filtering the oil in a vacuum chamber, or
settling.

However, common to these techniques are that they either require a lot of space or can be quite expensive.

Thus, in situations where both the available space for manoeuvring and mounting a water removal system into place is very limited, such as aboard ships, and where the user is very cost-sensitive, there is a need for a water removal system that provides a compact and simple solution.

In accordance with the invention, there is provided a system for removing water from oil from an oil supply, where the system comprises a housing comprising an inner opening, an oil inlet tube connecting the oil supply and an oil inlet of the housing, where the oil inlet tube comprises an inlet pump adapted to provide a flow of oil in a direction from said oil supply to said oil inlet, an oil outlet tube connecting an oil outlet of the housing and the oil supply, where the oil outlet tube comprises an outlet pump adapted to provide a flow of oil in a direction from said oil outlet to said oil supply, an air inlet tube providing a gas connection between an air supply unit and an air inlet of the housing, and an air outlet tube providing a gas connection between an air outlet of the housing and the air supply unit, where said outlet pump is adapted to provide a flow at a higher pumping flow rate than the pumping flow rate provided by said inlet pump.

By providing a system which has a housing in which both oil and air are introduced, it is possible to make use of the chemical separation process, stripping, which is also referred to as desorption for removing the water from the oil. In the desorption process, one component of a liquid stream, i.e. water, moves by mass transfer into a vapour phase, i.e. steam, through the liquid-vapour interface. Desorption is an effective and simple (and thereby a low-cost) way of removing water from oil.

By providing both an inlet pump and an outlet pump for leading the flow of oil through the housing, it is ensured that the flow of oil can be controlled according to required needs, such as the amount of oil in the oil supply and the amount of water in the oil, e.g. where the flow of oil through the system is lowered if the amount of water in the oil increases.

When using a system for removing water from oil by way of desorption, the oil and the air is combined. This combination may result in formation of foam (a mass of small air bubbles) on the surface of the oil. If not minimised, the foam may potentially spread to the other elements of the system, such as to the outlet pump, the air tubing or air supply unit, which may lead to these elements being damaged or at best having to be cleaned to function properly again.

Thus, it is an advantage that said outlet pump is adapted to provide a flow at a higher pumping flow rate than the pumping flow rate provided by said inlet pump. Thereby, it is ensured that foam and oil are removed from said housing at a higher pumping flow rate than the oil is introduced, which means that any foam created will be removed as quickly as it is formed. The risk of other elements of the system being damaged by the oil and foam is thereby eliminated.

Further, it is ensured that the oil is removed from said housing immediately after reaching the oil outlet of said housing so that there is no risk of the oil overflowing said housing. The manufacturing of said system is also made more simple as e.g. sensors for detecting if oil is overflowing said housing may be spared.

Thus, a simple and safe system is provided, where the requirement for unwanted service due to oil contamination is eliminated.

In an embodiment, a first part of the inner opening of said housing can be arranged downstream of said oil inlet and upstream of said oil outlet.

By providing that a first part of said inner opening is arranged downstream of said oil inlet and upstream of said oil outlet, it is ensured that the oil is only present in a part/section of said inner opening and therefore does not fill up said inner opening completely, but only partly.

The result is that a volume/part/section of said inner opening is not filled with oil (e.g. a second part) which has the advantage that oil or foam accidentally bypassing the oil outlet does not have immediate access to the other elements of the system, but instead stays in the housing until being removed via the oil outlet.

Further, the air in the housing may be accumulated in the volume/part/section of said inner opening not filled with oil before being removed via said air outlet of said housing, whereby oil accidentally being led past the oil outlet by the air will drop back to a position prior to said oil outlet instead of escaping the housing e.g. via the air outlet.

In an embodiment, said oil outlet can be arranged at a vertically higher location than said oil inlet.

By a vertically higher location is understood relative to gravity, when the system is placed, as it will be during operation. Hence, the vertically higher location is gravitationally higher, such that an item subjected to no other forces would fall from the plane of the higher position towards the plane of the lower position.

Thereby, the oil can enter said housing via the oil inlet and fill the inner opening until the surface of the oil reaches the oil outlet, where the oil leaves the inner opening. Therefore, the system functions by means of an overflow of oil.

Thus, in an embodiment, the oil can exit the housing by means of an overflow of oil, and the housing can therefore be an overflow system.

In an embodiment, the invention teaches a system for removing water from oil from an oil supply, where the system comprises a housing comprising an inner opening,
an oil inlet tube connecting the oil supply and an oil inlet of the housing, where the oil inlet tube comprises an inlet pump adapted to provide a flow of oil in a direction from said oil supply to said oil inlet,
an oil outlet tube connecting an oil outlet of the housing and the oil supply, where the oil outlet tube comprises an outlet pump adapted to provide a flow of oil in a direction from said oil outlet to said oil supply,
an air inlet tube providing a gas connection between an air supply unit and an air inlet of the housing, and
an air outlet tube providing a gas connection between an air outlet of the housing and the air supply unit,
characterised in that
said outlet pump is adapted to provide a flow at a higher pumping flow rate than the pumping flow rate provided by said inlet pump, and in that
said oil outlet is arranged at a vertically higher location than said oil inlet.

Providing an overflow system combined with the outlet pump operating at a higher pumping flow rate than the inlet pump results in that the amount of oil can be kept constant inside the housing. This ensures, in an effective and simple way, that the oil is kept in the housing for a required time-interval sufficient for removing water, without e.g. risking that the oil is oxidated or that the oil is kept in the housing even though the water has been removed.

The overflow system enabled by the position of the oil outlet vertically higher than the oil inlet thus works together with the inlet and outlet pump to avoid adverse effects of the formation of foam inside the chamber.

Foam tends to take up a large volume, as it comprises a significant amount of gas relative to the liquid forming the shell of the bubbles. Hence, the foam will make the level of the fluid contents within the chamber rise, when foam is formed within the chamber. This increase in the fluid level will cause the fluid to reach the outlet, thus a quicker rise of the fluid level, e.g. cause by the formation of foam, will lead to fluid leaving the chamber sooner, as the level of fluid within the chamber reaches the oil outlet.

This effect is supported by the outlet pump being adapted to provide a flow at a higher pumping flow rate than the pumping flow rate provided by said inlet pump. This ensures that the foam, having a low density, will be driven or sucked through the outlet as soon as it is formed. As the foam is lighter than the oil, it will form on the top surface of the liquid oil level and will reach the oil outlet before the liquid oil, which has not formed foam, and hence it will feel the pull of the outlet before the liquid oil, as the foam comes within range first. This effect is also enhanced by the lower density of the foam compared to the liquid oil, as a smaller force is necessary to move the foam than the liquid oil. This benefit of the foam being efficiently removed is achieved because the oil outlet is at a vertically, i.e. gravitationally, higher position of the chamber than the oil inlet, as that ensures that the light foam reaches the oil outlet before the liquid oil. If the oil outlet was gravitationally below the oil inlet, the foam would still form on top of the liquid level, but the heavier liquid oil would be pulled from the chamber first, and the foam might continue to rise on top of the liquid oil level.

Hence, the combination of the outlet pump being adapted to provide a flow at a higher pumping flow rate than the pumping flow rate provided by the inlet pump and the oil outlet being arranged at a vertically higher location than said oil inlet ensures that any foam forming on top of the liquid oil level is removed efficiently, and it allows control of the fluid level within the chamber.

In an embodiment, the system can further comprise a heating element arranged upstream of said oil outlet.

Preferably, the oil contacts (flows past) said heating element on its way towards the oil outlet of the housing. The heating element may have a higher temperature than the oil flowing past it so that the heating element is heating the oil. The heating element can be set to any required power so that the oil is heated to a desired temperature, where the required power depends on the temperature of the oil, when it enters the system. Therefore, the system may further comprise a temperature sensor for detecting the temperature of the oil which temperature sensor can be used for operating the heating element.

Heating the oil has the advantage that the air entering said housing is also heated. This is important as the amount of water removed by the air is dependent on the temperature and humidity of the air—the higher the temperature, the higher the amount of water which can be removed.

The amount of water, which can be removed by the air, is illustrated by the well-known Molliers diagram. There, it is seen that the amount of water, which can be present in the air, before saturation is reached, increases with an increase in the temperature of the air.

Thus, by providing a heating element, the temperature of the oil and air present in the housing can be increased, and the amount of water removed from the oil can be increased.

In an embodiment, the air inlet of the housing can be arranged downstream of said oil inlet.

The air inlet of the housing can therefore be arranged at said first part of said inner opening.

Thereby, it is ensured that the air is mixed with the oil. This mixing results in that the air may be heated by the oil (if the oil temperature is higher than the air temperature) and that the air may move (as bubbles) through the oil, which increases the ability of the air to remove the water from the oil.

In an embodiment, the housing can further comprise a porous material arranged in said first part of said inner opening.

The porous material may be arranged so that it covers or almost completely covers a cross-section of the housing. The porosity of the material should be of a size so that the oil can flow through it relatively easy without experiencing a large pressure drop.

In an embodiment, said porous material can be arranged at least partly downstream of said air inlet.

Thereby, both the oil and the air have to flow through the porous material before reaching the oil outlet and the air outlet, respectively.

When the air flows through the porous material it has to spread out across the porous material to flow through the pores of said material. The advantage is that the air is then prevented from accumulating into large air bubbles, but instead is distributed out into several small air bubbles. This increases the total surface area of the air and therefore increases the amount of water able to be collected by the air on its way through the oil.

In an embodiment, said air outlet can be arranged at a second part of the inner opening of said housing, said second part can be arranged vertically above said oil outlet.

It is an advantage to also have a second part in the inner opening of the housing, with said second part being arranged vertically above said oil inlet. Thereby, the air, which has flown through the oil, may accumulate at said second part which is free of any oil as the oil leaves the housing via the oil outlet. Also, as written above, air may be accumulated in said second part before being removed via said air outlet, whereby oil accidentally being led past the oil outlet by the air can drop/fall back to a position prior to said oil outlet instead of escaping the housing via the air outlet.

In an embodiment, said system can further comprise an oil filter arranged in the oil outlet tube.

Providing an oil filter in the oil outlet tube has the advantage that the oil is filtered before returning to the oil supply. This is known to be an advantage as this way, e.g. particle contaminants are removed from the oil which would otherwise reduce the lifetime of the machinery/equipment using the oil in the oil supply.

Arranging the oil filter downstream of the housing has the advantage that the oil filter is not exposed to the water present in the oil. Water is known to influence the filtering efficiency of an oil filter and is therefore an unwanted element in the oil.

In an embodiment, said oil filter can be arranged downstream of the outlet pump.

Thereby, the pressure of oil provided to the oil filter can be kept relatively constant so that the structure of the oil filter is not stressed unnecessarily, e.g. by a fluctuating pressure.

In an embodiment, said system can further comprise an air vent tube which connects the oil filter and the housing.

As the pumping flow rate of the outlet pump is higher than that of the inlet pump, the outlet pump may run dry at times and may pump not only oil, but also air from the housing. For this reason, air will also be led to the oil filter.

It is known when having air present in the oil that the pressure drop across the filter will cause the air bubbles in the oil to expand into a larger volume and may also lead to a release of dissolved air. This expansion of air will pull solid particles to be filtered through the pores or openings of the oil filter and release already trapped solid contaminants, thereby leading to a decreased filtering efficiency.

Pressurising the filtered oil at the outlet of the oil filter, i.e. providing a back pressure, ensures that all air remains dissolved in the oil. Thus, no free air bubbles are formed when the oil passes through the filter. For this reason, a back pressure (such as a valve) may be arranged at the outlet side of the oil filter.

However, said system may also or alternatively comprise an air vent tube which connects the oil filter with the housing of the system. By having such an air vent tube, at least the main part of the air being introduced to the oil filter may be led back to said housing via the air vent tube and be reused or released via the air outlet tube instead of being led through the oil filter and to the oil supply.

In an embodiment, the air inlet tube can comprise an air vent/fan. An air vent/fan is a low-cost and effective means of providing a flow of air.

In an embodiment, the air supply unit can comprise a condensing system. The condensing system may comprise a fan-cooled radiator, which is a low-cost, simple and effective means of removing a water content from air by condensation.

In accordance with the invention, there is further provided a method of removing water from oil from an oil supply, where the method comprises the steps of providing a housing comprising an inner opening, introducing the oil from the oil supply via an oil inlet tube to the housing, where the oil inlet tube comprises an inlet pump providing a flow of oil in a direction from said oil supply to said oil inlet, releasing the oil from the housing via an oil outlet to an oil outlet tube leading to said oil supply, where the oil outlet tube comprises an outlet pump providing a flow of oil in a direction from said oil outlet to said oil supply, introducing a flow of air from an air supply unit into the housing, via an air inlet tube, and removing a flow of air from the housing via an air outlet tube, where said outlet pump is providing a flow at a higher pumping flow rate than the pumping flow rate provided by said inlet pump.

The structure and function of the system and the method of using it will be described in more detail below with references to exemplary embodiments shown in the drawings wherein, FIG. 1 shows an embodiment of a system according to the invention.

Figure 2:
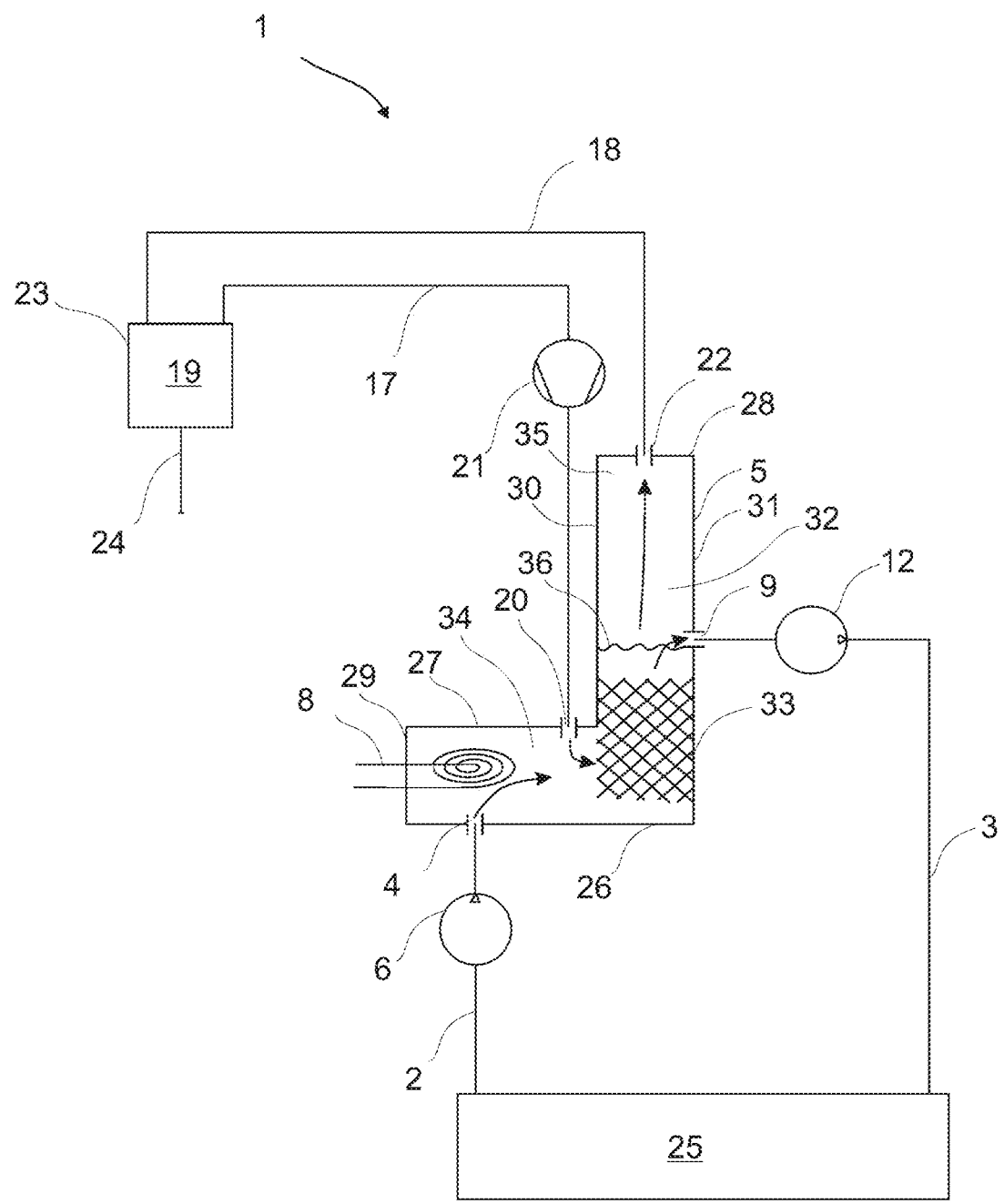

FIG. 2 shows an embodiment of a system according to the invention.

In FIG. 1, a system 1 for removing water from oil from an oil supply (not shown) is shown.

The system 1 is shown to have an oil inlet tube 2 and an oil outlet tube 3.

The oil inlet tube 2 connects the oil supply at a first end 2a and an oil inlet 4 of a housing 5 at a second end 2b. The oil inlet tube 2 is led through an inlet pump 6 which is adapted to provide a flow of oil in a direction from said oil supply to said oil inlet 4 as indicated by the arrow 2'.

It is shown that the oil inlet tube 2 may further be led through a non-return valve 7 for preventing oil returning to the oil supply via the oil inlet tube 2 (i.e. counter to the direction of the arrow 2'). The non-return valve 7 may be set at e.g. 4 bars to prevent oil from the oil supply from entering the system at standstill. The non-return valve 7 may be arranged downstream of the inlet pump 6.

The oil inlet tube 2 may further be led through a heating element 8 for heating the oil before it enters the housing 5 (e.g. to 50° C.-80° C.). However, it is foreseen that the heating element 8 may be arranged in the housing 5 instead, as long as it heats the oil before the oil is treated in the housing 5. The heating element 8 may e.g. provide 1000 Wand include a temperature control to ensure that the oil is heated correctly according to the specific temperature of the oil so that the required oil temperature of the oil in the housing 5 is reached. The heating element 8 may be arranged downstream of the inlet pump 6 and/or of the non-return valve 7.

At a first end 10, the oil outlet tube 3 connects an oil outlet 9 of the housing 5 to said oil supply at a second end 11. The oil outlet tube 3 is led through an outlet pump 12 which is adapted to provide a flow of oil in a direction from said oil outlet 9 to said oil supply as indicated by the arrow 3'.

Said outlet pump 12 is adapted to provide a flow at a higher pumping flow rate than the pumping flow rate provided by said inlet pump 6. In one embodiment, the pumping flow rate of the outlet pump 12 may be more than 10% higher than the pumping flow rate of the inlet pump 6. In one embodiment, the pumping flow rate of the outlet pump 12 may be more than 50% higher than the pumping flow rate of the inlet pump 6.

The oil outlet tube 3 may further be led through an oil filter 13 and a second non-return valve 14, both of which may be arranged downstream of the outlet pump 12.

In a preferred embodiment of the invention, the oil inlet 4 of the housing 5 is placed at a vertically lower position than the oil outlet 9 of the housing 5. By vertically lower is to be understood in relation to gravity, when the system is configured, as it would be during operation. Hence, an item released at the plane of the vertically, i.e. gravitationally higher, oil outlet 9 and subjected to no other forces than gravity would fall towards the plane in a vertically lower position such as the plane in which the oil inlet 4 is placed. In other dimensions than the vertical direction, the oil inlet 4 and the oil outlet 9 of the housing 5 may be placed independently of each other, such that they may be on the same side of the housing 5, on opposing sides, or at an angle compared to each other.

In a variant of the invention, the oil inlet 4 of the housing 5 is placed in the lower half of the chamber 5. In such an embodiment, the oil outlet 9 of the housing 5 may be placed in the upper half of the chamber 5. Upper and lower is still considered relative to the direction of gravity, when the chamber 5 is in the position it will be in during operation of the system for removing water from oil.

Placement of the oil inlet 4 of the housing 5 above the oil outlet 9 of the housing 5 enables the system to operate as an overflow system, wherein the fluid exits the chamber 5 once a certain level has been reached. The dimensions of the chamber 5 as well as the vertical position of the oil outlet 9 of the chamber 5 may vary between different embodiments of the system such that the volume of fluid, which may be contained within the chamber, before the oil outlet is reached by the surface level of the fluid, is matched to the specific embodiment of the system.

The oil filter 13 may be arranged in a filter unit (not shown) and may comprise (be made of) a natural or synthetic polymer, such as a cellulose material. The oil filter 13 may have a cylindrical shape with an inner opening, where an outer surface of the oil filter 13 defines an inlet of the oil filter 13, so that the oil flows from the outer surface to the inner opening of said oil filter 13 before leaving the oil filter 13 (and the filter unit).

The second non-return valve 14 may be a back pressure valve 14, so that a pressure is applied on the oil filter 13.

As explained earlier, it is known when having e.g. air present in the oil that the pressure drop across the oil filter 13 will cause air bubbles in the oil to expand into a larger volume and may also release dissolved air into the oil. This expansion of air will pull solid particles to be filtered through the pores or openings of the oil filter 13 and release already trapped solid contaminants, thereby leading to a decreased filtering efficiency.

Pressurising the filtered oil at the outlet of the oil filter 13, i.e. a back pressure by use of the second non-return valve 14, ensures that all air in the oil flowing through the oil filter 13 remains dissolved in the oil. Thus, no free air bubbles are formed when the oil passes through the oil filter 13. For this reason, a back pressure may be arranged at the outlet side of the oil filter 13.

An air vent tube 15 is shown to connect the oil filter 13 with the housing 5. However, it is foreseen that said air vent tube 15 connects a filter unit (containing the oil filter 13 in an inner opening) with the housing 5.

When providing that the outlet pump 12 operates at a higher pumping flow rate than the inlet pump 6, not only oil, but also an amount of air, is led to the oil filter 13 and filter unit.

As mentioned earlier, it is desired to have a minimum amount of air present in the oil, when it flows through the oil filter 13. For this reason, it is an advantage that the system 1 comprises the air vent tube 15 in order to remove as much air as possible from the oil+air mixture being pumped out from said housing 5 and in order to lead the air back to said housing 5 as shown by the arrow 15'.

Advantageously, the air vent tube 15 is connected to a vertically upper part of the said filter unit (oil filter), as air would usually accumulate at said vertically upper part.

A third non-return valve 16 may be arranged in the air vent tube 15 to allow air to leave, but not enter, the oil filter 13 (filter unit).

In FIG. 1, it is shown that the system 1 further comprises an air inlet tube 17, an air outlet tube 18 and an air supply unit 19.

The air inlet tube 17 provides a gas connection between the air supply unit 19 and an air inlet 20 of the housing 5. An air pump 21 (fan/air vent) may be inserted in the air inlet tube 17 to provide a flow of air in a direction from said air supply unit 19 to said housing 5, as is indicated by the arrow 17', to ensure that the required flow of air is introduced into the housing 5.

The air outlet tube 18 provides a gas connection between an air outlet 22 of the housing 5 and the air supply unit 19. Air containing an increased amount of water (maybe even saturated air) compared to the air introduced in said housing 5 may then leave said housing 5 and flow to said air supply unit 19 as is indicated by the arrow 18'.

The air supply unit 19 may comprise a condensing system 23 for removing at least part of the water content in the air. The condensing system 23 may be a fan-cooled radiator, a cooling liquid condensing system or other. The water removed from the air may leave the system via a water drain tube 24.

FIG. 2 shows an embodiment of a system 1 according to the invention.

For similar features as the features shown in FIG. 1, similar reference numbers have been used.

As in FIG. 1, the system 1 shown in FIG. 2 comprises an oil inlet tube 2, an oil outlet tube 3, an air inlet tube 17 and an air outlet tube 18. However, in FIG. 2, the oil inlet 2 and oil outlet tubes 3 are shown to be connected to an oil supply 25.

In FIG. 2, the housing 5 of the system 1 is shown to have an L-shape comprising a lower surface 26, a middle surface 27 and a top horizontal surface 28, and a first 29, second 30 and third vertical surface 31.

In an inner opening 32 of the housing 5, a heating element 8 and a porous material 33 may be arranged.

As is indicated by the arrows, the oil is introduced into the housing 5 via the oil inlet 4 (lower horizontal surface 26) and is filling up the inner opening 32 of the housing 5 and passes the porous material 33, until the oil surface 36 reaches the oil outlet 9 (third vertical surface 31). The filled part of said inner opening 32 defines a first part 34 of said inner opening 32 arranged downstream of said oil inlet 4 and upstream of said oil outlet 9. The remainder of said inner opening 32 defines a second part 35 of the inner opening 32 of said housing 5, said second part 35 being arranged vertically above said oil outlet 9. On the way from said oil inlet 4 to said oil outlet 9, the oil is heated by the heating element 8.

Simultaneously, as indicated by the arrows, air is introduced into the housing 5 via the air inlet 20 arranged in said first part 34 downstream of said oil inlet 4 and upstream of said oil outlet 9 (middle horizontal surface 27). The air mixes with the oil and is divided into several small air bubbles when passing the porous material 33. During the mixing, the air is heated by the heated oil and absorbs water from the oil before leaving the housing 5 via the air outlet 22 arranged at the second part 35 of said inner opening 32, said second part 35 being arranged vertically above said oil outlet 9 (top horizontal surface 28).

The invention claimed is:

1. A method of removing water from an oil of an oil supply, wherein the method comprises:
    providing a housing that defines an inner space;
    enabling an oil to flow from an oil supply through an oil inlet tube to an oil inlet of the housing;
    fluidly coupling an inlet pump to the oil inlet tube so as to provide a first flow of oil from the oil supply to the oil inlet according to a first pumping flow rate;
    introducing a flow of a gas through a gas inlet tube and into the inner space of the housing;
    after a surface level of the oil rises at least to an oil outlet position, releasing to an oil outlet, the oil and a foam formed on a surface of the oil so that the released oil and foam flow to an oil outlet tube that is fluidly connected to the oil supply;
    fluidly coupling an outlet pump to the oil outlet tube so as to provide a second flow of the oil from the oil outlet to the oil supply according to a second pumping flow rate, wherein the second pumping flow rate is greater than the first pumping flow rate; and
    removing a portion of the gas from the inner space of the housing through a gas outlet tube, thereby removing water from the oil.

2. The method of claim 1, further comprising:
    heating a portion of the oil in the inner space of the housing; and
    condensing water from the flow of the gas before the step of introducing the flow of gas through the gas inlet tube and into the inner space of the housing.

3. The method of claim 1, wherein the housing is configured so that:
    part of the inner space of the housing is positioned downstream of the oil inlet and upstream of the oil outlet; and
    the gas inlet of the housing is positioned downstream of the oil inlet.

4. The method of claim 1, wherein the housing is configured so that, when the housing is vertically oriented:
    a first part of the inner space of the housing is positioned downstream of the oil inlet and upstream of the oil outlet; and
    a second part of the inner space of the housing is positioned vertically above the oil outlet.

5. The method of claim 4, wherein the gas inlet of the housing is positioned downstream of the oil inlet.

6. A method of manufacturing a system that is operable to remove water from an oil of an oil supply, wherein the method comprises:
    configuring a housing to define an inner space, wherein the configuring of the housing comprises configuring the housing to enable an oil to flow from an oil supply through an oil inlet tube to an oil inlet of the housing;
    fluidly coupling an inlet pump to the oil inlet tube so as to enable a first flow of the oil from the oil supply to the oil inlet according to a first pumping flow rate, wherein:
        the housing is configured to receive a flow of a gas through a gas inlet tube and into the inner space of the housing; and
        the housing is configured so that, after a surface level of the oil rises at least to a position of an oil outlet of the housing, the oil and a foam formed on a surface of the oil are released to the oil outlet and flow to an oil outlet tube that is fluidly connected to the oil supply; and
    fluidly coupling an outlet pump to the oil outlet tube so as to enable a second flow of the oil from the oil outlet to the oil supply according to a second pumping flow rate, wherein the second pumping flow rate is greater than the first pumping flow rate,
    wherein the housing is configured to output a portion of the gas from the inner space of the housing through a gas outlet tube, thereby removing water from the oil.

7. The method of claim 6, further comprising:
    configuring a heating element to heat a portion of the oil in the inner space of the housing; and
    configuring a condenser to condense water from the flow of the gas upstream of the gas inlet tube.

8. The method of claim 6, wherein the configuring of the housing comprises configuring the housing so that:
    part of the inner space of the housing is positioned downstream of the oil inlet and upstream of the oil outlet; and
    the gas inlet of the housing is positioned downstream of the oil inlet.

9. The method of claim 6, wherein the configuring of the housing comprises configuring the housing so that, when the system is vertically oriented:
    a first part of the inner space of the housing is positioned downstream of the oil inlet and upstream of the oil outlet; and
    a second part of the inner space of the housing is positioned vertically above the oil outlet.

10. A method of facilitating a separation and removal of water from an oil of an oil supply, wherein the method comprises:
    configuring a housing to define an inner space and to enable an oil to flow from an oil supply through an oil inlet tube to an oil inlet of the housing;
    configuring an inlet pump to fluidly couple to the oil inlet tube so as to enable a first flow of the oil from the oil supply to the oil inlet according to a first pumping flow rate, wherein:
        the configuring of the housing comprises configuring the housing to receive a flow of a gas through a gas inlet tube and into the inner space of the housing; and
        the configuring of the housing further comprises configuring the housing so that, after a surface level of the oil rises at least to a position of an oil outlet of the housing, the oil and a foam formed on a surface of the oil are released to the oil outlet and flow to an oil outlet tube that is fluidly connected to the oil supply; and configuring an outlet pump to fluidly couple to the oil outlet tube so as to provide a second flow of the oil from the oil outlet to the oil supply according to a second pumping flow rate, wherein the second pumping flow rate is greater than the first pumping flow rate, wherein the configuring of the housing further comprises configuring the housing to output a portion of the gas from the inner space of the housing through a gas outlet tube, thereby removing water from the oil.

11. The method of claim 10, further comprising configuring a heating element to heat a portion of the oil in the inner space of the housing.

12. The method of claim 11, further comprising configuring a condenser to condense water from the flow of the gas upstream of the gas inlet tube.

13. The method of claim 12, further comprising positioning a porous material in the inner space of the housing at least partly downstream of the gas inlet tube, so that the porous material distributes the flow of gas into bubbles in the oil.

14. The method of claim 10, wherein the configuring of the housing further comprises configuring the housing so that, when the housing is vertically oriented:
 a first part of the inner space of the housing is positioned downstream of the oil inlet and upstream of the oil outlet; and
 a second part of the inner space of the housing is positioned vertically above the oil outlet.

15. The method of claim 14, further comprising configuring a water drain tube downstream from the gas outlet tube.

16. The method of claim 10, wherein the configuring of the housing further comprises configuring a water drain tube downstream from the gas outlet tube.

* * * * *